No. 870,548. PATENTED NOV. 12, 1907.
G. DENTZEAU.
TIRE SHOE.
APPLICATION FILED NOV. 4, 1905.
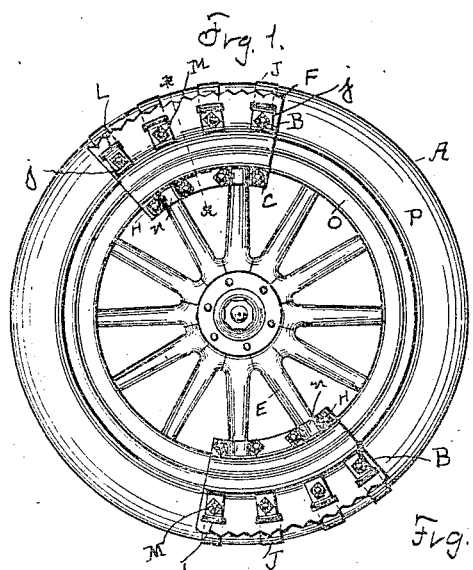
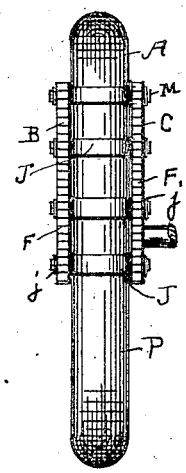
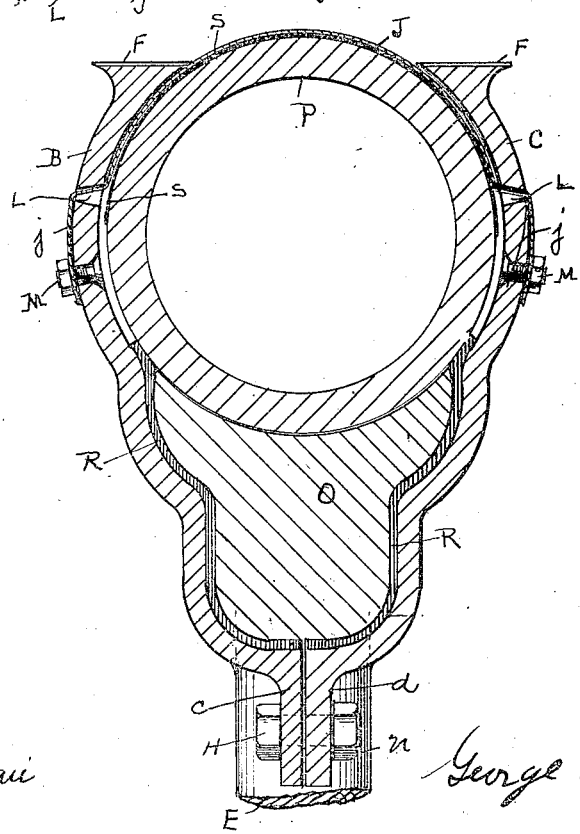
Witnesses
Wm Dentzeau
C. Barrett.
Inventor
George Dentzeau

UNITED STATES PATENT OFFICE.

GEORGE DENTZEAU, OF WEST NEW YORK, NEW JERSEY.

TIRE-SHOE.

No. 870,548.   Specification of Letters Patent.   Patented Nov. 12, 1907.

Application filed November 4, 1905. Serial No. 285,846.

*To all whom it may concern:*

Be it known that I, GEORGE DENTZEAU, a citizen of the United States, and a resident of West New York, in the county of Hudson and State of New Jersey, have invented certain new and useful Improvements in Tire-Shoes, of which the following is a specification.

My invention relates to vehicle wheels, especially automobile wheels, and the object is to provide wheels of that class with a shoe which is intended to increase the grip of the wheel, lessen the sliding tendency, and protect the tire against any lateral contact or compact.

My invention consists of two shells and means of holding and securing them together against the surfaces of the tire.

Referring to the drawing of which Figure 1 is a side view of an automobile wheel showing my shoe attached, Fig. 2 is a plan view of Fig. 1, Fig. 3 is an enlarged sectional view of the tire and the shoe on line $xx$ Fig. 1.

Letter A represents the wheel, in this case an automobile wheel. As the construction of the wheel does not form any part of my invention it therefore is not necessary to describe it in any of its particulars.

The shoe consists of two halves or shells B and C, each of which is so shaped as to conform with the circumference and diameter curvatures of the tire P and rim O (see Fig. 1—3) in order that the shells will hug more closely to those parts. The lower part $c\,d$ of the shells are each provided with semi-circular enlargements $n$ to permit that portion to surround the spokes E when the shells are joined together (see Fig. 1—3).

The outer circumference of each shell of the shoe is enlarged (see Fig. 3) and the surfaces F serrated or ribbed, to increase the gripping force of each of the shells.

The shells can be made of any kind of metal. The shape of the shells must conform to the size and shape of the wheel used. They will, therefore, have to be increased or lightened in weight and changed in shape to meet different wheels. The shells may be cast solid or open-work. The shells are placed on the wheels as shown in Figs. 1—2—3. To prevent the shells injuring the rim O, I interpose a lining of felt R (see Fig. 3). When the shells are placed the serrated edges F will come within a short distance of the outer circumference of the tire. The lower edges of the shells are then joined and held together by bolts H. The upper edges are held together by steel bands J which pass over the tire (see Fig. 2) and the free ends thereof $j$ passed through the side slots L in the shells, where they are bent down and secured to the said shells by bolts M. Before the bands are put in place a leather cushion S is placed under each to protect the tire. One of the advantages of this shoe, is that when the tire is compressed by reason of the weight of the car or any other cause the shells will act as a solid gripping surface upon any slippery ground and thereby prevent the wheel churning, slipping or sliding. The metal bands J will also bend with the tire and they themselves also add to the friction of the wheel upon the ground.

There will preferably be two shoes placed on a wheel, but I do not confine myself to that number as one only may be used, or the wheel may have one continuous shoe covering the entire tire.

Another advantage of this shoe is that it acts as a side shield to the tire, thereby preventing any injury being done to that portion of the wheel.

What I claim is:—

1. In a vehicle wheel, the shoe, consisting of two halves, having serrated outer surfaces, and spoke sockets, means of holding the shells together at the bottom consisting of bolts and nuts, and means of holding the outer edges.

2. In a vehicle wheel, the shoe, consisting of two shells, each having serrated outer surfaces, means of holding the shells on to the tire and wheel consisting of bolts, and means of holding the outer ends together consisting of the bands J, passing through slots in shells and secured to the same by bolts.

3. In a vehicle wheel, the shoe, formed in two halves, each having a serrated edge, the cushion interposed between the shells and rim of the wheel, and means of holding the parts together at the bottom, and means of holding the parts together at the top consisting of metal bands suitably secured to the side of the shells.

4. In a vehicle wheel, the shoe consisting of two parts or shells having serrated edges, the interposing cushion placed between the shells and rim, and the interposing cushions placed between the tire and metal bands J, means of securing the shells together at the bottom consisting of bolts, and means of holding the outer edges of the shells together consisting of the bands J suitably secured to the said shells.

Signed at New York in the county of New York and State of New York this 2nd day of November A. D. 1905.

GEORGE DENTZEAU.

Witnesses:
WM. DENTZEAU,
C. BARRITT.